May 14, 1935. I. ELLIOTT 2,001,243
METHOD AND MECHANISM FOR FORMING ARTICLES OF PLASTIC MATERIAL
Filed July 6, 1933 2 Sheets-Sheet 2
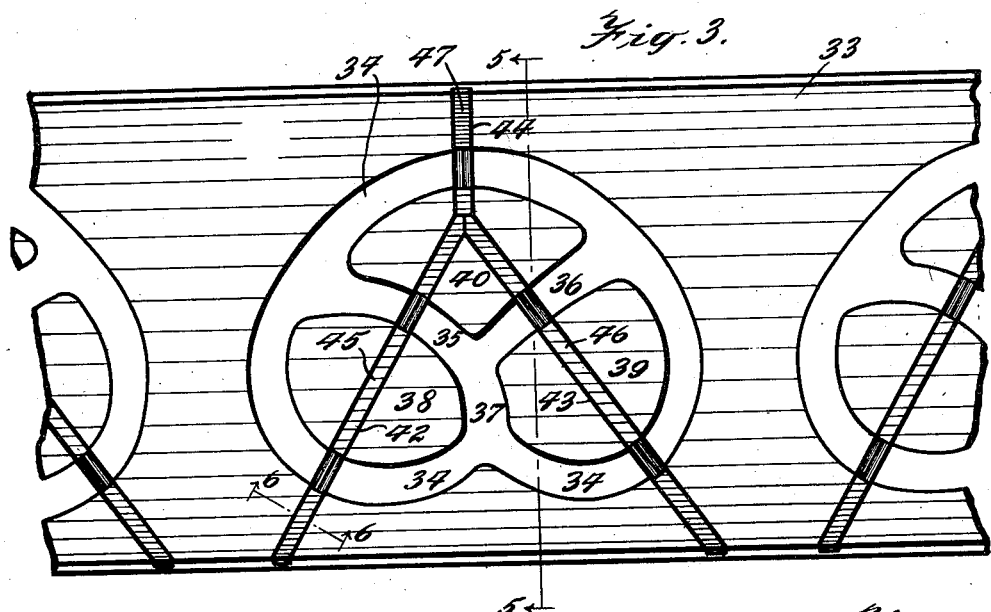
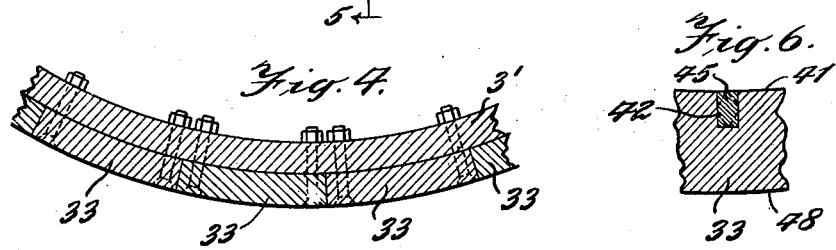
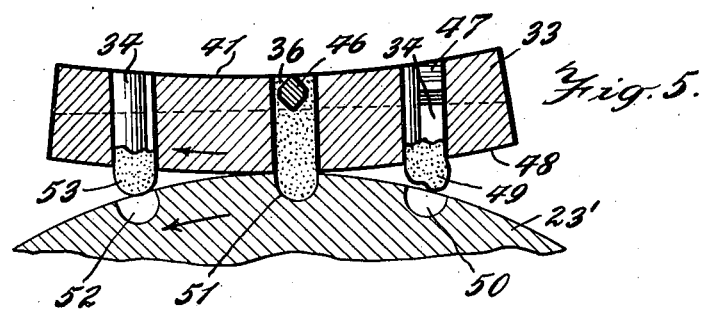
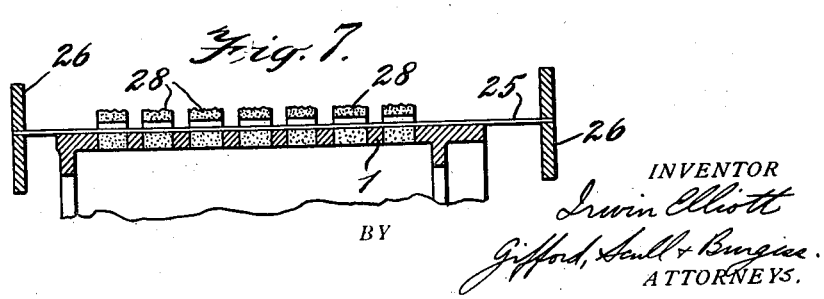
INVENTOR
Irwin Elliott
BY
Gifford, Scull & Burgess
ATTORNEYS.

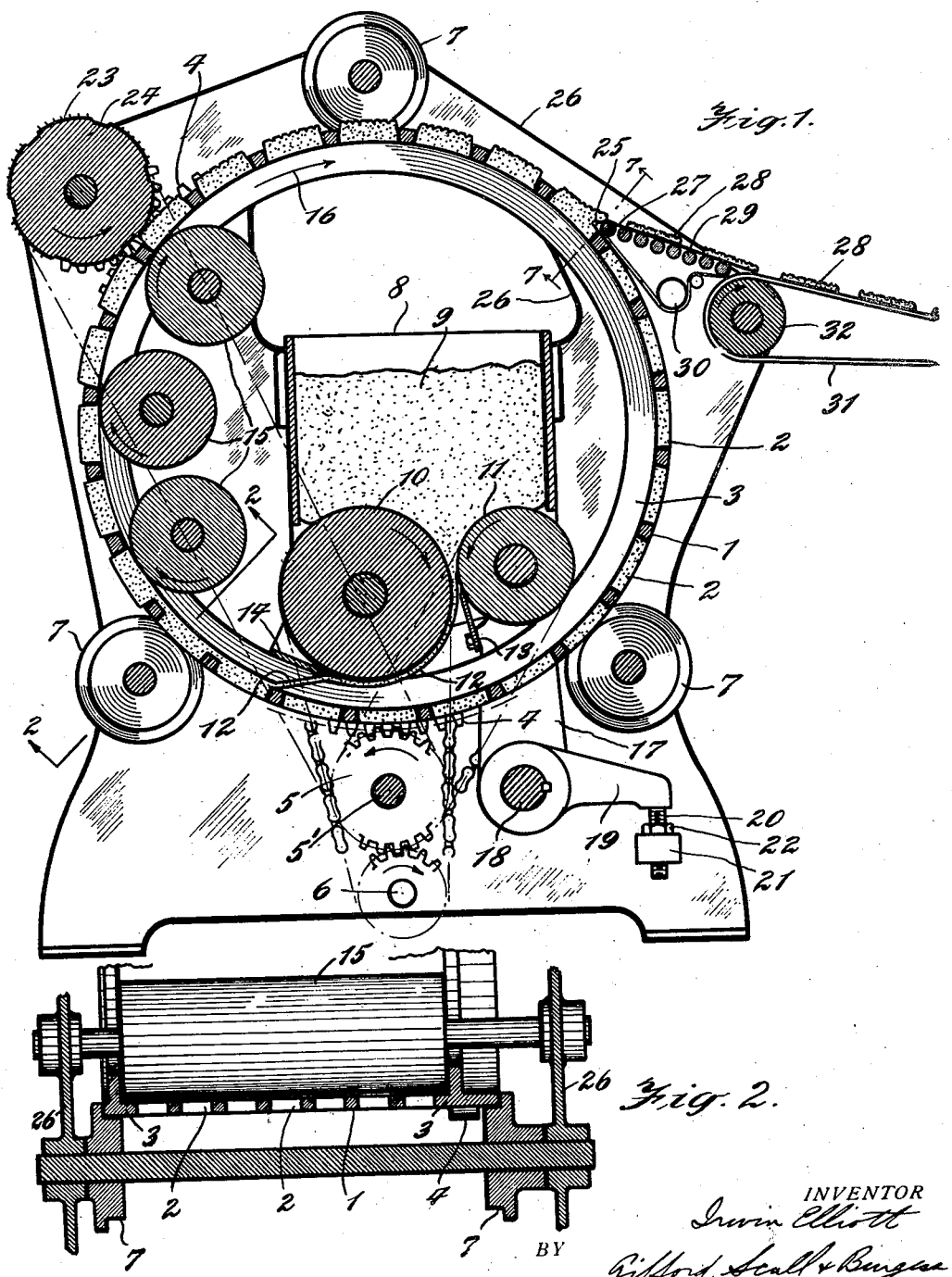

Patented May 14, 1935

2,001,243

UNITED STATES PATENT OFFICE 2,001,243

METHOD AND MECHANISM FOR FORMING ARTICLES OF PLASTIC MATERIAL

Irwin Elliott, Harmon, N. Y., assignor to Universal Oven Company, Incorporated, New York, N. Y., a corporation of New York Application July 6, 1933, Serial No. 679,199

7 Claims. (Cl. 107—8)

This invention relates to a novel and improved method of forming articles of plastic material, such as bakers' dough, and also to a mechanism for practicing that method. The invention finds particular utility in the baking art, and it will be described in connection therewith and more particularly in connection with the formation of pretzels, although it may find utility in connection with forming articles from other substances.

The invention will be best understood from the following description and the annexed drawings, in which I have shown selected embodiments of the invention and in which:

Fig. 1 is a vertical sectional view through a mechanism for practicing the invention;

Fig. 2 is a section on the line 2—2 of Fig. 1;

Fig. 3 is a view on an enlarged scale showing a segment of the mold particularly designed for making pretzels;

Fig. 4 is a fragmentary view showing how such segments may be secured to the machine appearing in Fig. 1;

Fig. 5 is a section on the line 5—5 of Fig. 3;

Fig. 6 is a section on the line 6—6 of Fig. 3;

Fig. 7 is a section on the line 7—7 of Fig. 1.

According to the illustrated embodiment of my invention, I provide a continuously moving mold, here shown as a hollow cylinder 1 having in the wall thereof a plurality of orifices 2. The cylinder has end frames 3 having thereon teeth 4 meshing with teeth on a gear 5 on a shaft 5' rotated by a pinion on a shaft 6, which may be the shaft of a motor or which may be driven from a suitable source of power. The cylinder is supported on a plurality of bearing rollers 7 so that it may rotate freely.

Disposed within the cylinder is a container, here shown as a hopper 8, adapted to contain plastic material 9, which I shall refer to as dough, merely for the sake of convenience. The dough is adapted to pass from the container between a pair of rolls 10 and 11, these rolls being so spaced as to form a layer or sheet 12 of dough therebetween. This layer is stripped from the roll 11 by a stripper 13 and from the roll 10 by a stripper 14.

After leaving the stripper 14, the sheet 12 passes into contact with the inside face of the wall of the cylinder and then is gradually forced into the orifices by passing between the wall of the cylinder and the row of rolls 15. The cylinder is rotating in the direction of the arrow 16, and the rolls are rotating in the direction of the various arrows appearing thereon, the rotation of the rolls 10 and 11 being caused by the chain drives indicated, but which will not be further described. It will be seen, however, that the rolls 15 are all rotating so that the parts of their peripheries adjacent the wall of the cylinder are moving in the same direction as that wall, and in fact these rolls may be idler rolls rotated by frictional contact with the dough. It will also be noted that the rolls 15 are progressively nearer to that wall of the cylinder so that, as the sheet 12 passes between the wall and the rolls 15, it is gradually forced into the orifices until it is completely received therein.

The thickness of the layer or sheet 12 shown in Fig. 1 is not as great as the thickness of the wall. However, after a few revolutions of the cylinder, successive layers of dough will be forced into the orifices, and finally each orifice will contain a mass of dough which will be forced through the orifice and project from the outer side of the wall, this wall forming the mold for the material. The thickness of the layer or sheet may be varied by adjusting the roll 11, and for that purpose this roll is mounted upon an arm 17 secured to a shaft 18 which may be adjusted by means of an arm 19 likewise secured to the shaft and contacting with an adjusting screw 20. The screw 20 is threaded in a stud 21 and is provided with the usual locking nut 22. Movement of the screw in the stud 21 will obviously cause movement of the roll 11.

As the cylinder rotates, and as masses of dough are forced through the orifices, they may be caused to contact with printing dies, indicated at 23 and formed on the periphery of a roll 24 likewise driven by any suitable means, such as the indicated chain drive from the shaft 5'.

The printing dies may cooperate with one of the rolls 15, here shown as the uppermost one, to imprint a desired shape on the dough or to cause the dough to take any shape which may be wished. After leaving the printing dies, the projecting parts of the masses of dough may be sliced off as by a stationary knife 25. This knife may be a wire, as best indicated in Fig. 7, and may, for example, stretch between side frames 26. These side frames may, of course, be used also to support the other parts of the mechanism. The knife 25 is preferably stationary and disposed closely adjacent the outer face of the cylindrical mold, and it will be seen that, as the mold rotates, the projecting parts of the various masses will be sliced off by the knife. A belt conveyor 27 may be provided closely adjacent the knife and in position to receive the sliced-off parts 28 as they come from the mold. This belt may be supported on a plurality of small rolls 29 and may be driven by a plate 30 from any suitable source of power. In turn, the belt 27 may discharge the parts 28 on a larger belt conveyor 31 running over a pulley 32 and conducting the parts away from the mechanism for any further processing which may be desired.

Referring now particularly to Figs. 3, 4, 5, and 6, I have shown in detail one form of mold which can be used and which is particularly adapted for forming pretzels or other articles in the form of rings or continuous shapes. The cylinder in these figures may conveniently be formed of a plurality of segments 33 bolted or otherwise secured to the frames 3' as indicated in Fig. 4.

The orifice through which the dough is forced is best indicated in Fig. 3, wherein it will be seen that it comprises several channels 34, 35, 36, and 37 intersecting each other to form continuous channels surrounding centers 38, 39, and 40. These centers are preferably united to the body of the segment which, for convenience, I shall refer to as the mold plate, by the following means and method.

Before the channels are formed, I cut in the face or side 41 of the plate 33 a groove or grooves, here shown as three in number and designated 42, 43, and 44. I then proceed to cut the various channels, which, of course, will separate the centers from the body of the plate. Nevertheless, the grooves in the centers may be readily re-aligned with the grooves in the body of the plate, and then supporting strips 45, 46, and 47 may be forced into the aligned grooves, tightly fitting the same and serving to re-unite the detached centers to the body of the plate adjacent the side 41 of the plate. It will be seen, particularly in Figs. 5 and 6, that the thickness of the strips is much less than the thickness of the plate, and therefore, when the dough is forced through the channels, it may flow around the parts of the strips which are in the channels and re-form as a continuous shape before leaving the orifice. In order to aid in this action, the strips are made with relatively sharp edges so as to cause the dough to divide easily and flow around them and may also be provided with converging sides towards the outer side 48 of the mold plate. In the drawings, I have shown the strips as being of hexagonal form across the channels, which I have found serves the desired purpose.

In Fig. 5, I have indicated approximately how the pretzel may be completed by cooperation with a forming die 23'. The dough will flow past the hexagonal-shaped parts of the supporting strips and fill the portions of the channels beneath the strips. When I use the word "beneath", of course, it is to be understood that I am referring to the parts as they appear in Fig. 5, and not in a limiting capacity. As shown in Fig. 5, the dough from the channel 34 is projecting outwardly, as indicated at 49, and is about to be received in a recess 50 in the die 23'. The dough which has flowed past the strip 46 has become a solid mass below that strip and has received its final form in the die cavity 51, whereas the dough in the channel 34 has already received its final form from the die cavity 52, as indicated at 53, and is about to leave that cavity. It is of course to be understood that the cavities 50, 51, and 52 are continuous, corresponding to the various channels of the mold plate, and so the result will be a continuous pretzel shape which will be sliced off by the knife 25 when the mold reaches the knife.

From the above it will be seen that I have devised a novel and simplified method and mechanism for making articles from plastic material in various shapes. The operation has been explained during the progress of the description, and no résumé thereof is deemed necessary. While I have shown and described certain parts in more or less detail, it is to be understood that various changes may be made therein without departing from the scope of the invention, and I therefore do not intend to limit myself except by the appended claims.

I claim:
1. The method of forming articles from plastic material which comprises forming said material into a sheet, forcing said sheet in successive layers into a plurality of orifices in a mold to form masses of material therein, forcing said masses through the orifices, and slicing off the portions of the material projecting from said orifices.

2. The method of forming articles from plastic material which comprises forcing said material in successive layers into an orifice in a mold to form a mass of material therein, forcing said mass through the orifice, and slicing off the portion of the material projecting from the orifice.

3. In a device of the class described, a hollow cylindrical mold having a plurality of orifices extending therethrough, means disposed within the cylinder to form a plastic material into a layer, means to rotate said cylinder, means to force said layer progressively into said orifices during said rotation of the cylinder, to form plastic masses therein, means to force said masses through said orifices, and a stationary knife disposed closely adjacent the outer surface of the cylinder and adapted to slice off projecting parts of said masses.

4. In a device of the class described, a hollow cylindrical mold having a plurality of orifices extending therethrough, means disposed within the cylinder to form a plastic material into a layer, means to rotate said cylinder, means to force said layer progressively into said orifices during said rotation of the cylinder, to form plastic masses therein, means to force said masses through said orifices, printing dies adapted to contact with projecting parts of said masses, and a stationary knife disposed closely adjacent the outer surface of the cylinder and adapted to slice off said projecting parts of said masses.

5. In a device of the class described, a hollow cylindrical mold having a plurality of orifices extending therethrough, a container for plastic material adapted to discharge said material within said cylinder, a plurality of rolls having their axes substantially parallel to the axis of the cylinder, means to rotate said cylinder and rolls, said rolls being arranged to form material coming from said container into a sheet and to force said sheet progressively into and through said orifices.

6. In a device of the class described, a hollow cylindrical mold having a plurality of orifices through the wall thereof, a container for plastic material adapted to discharge said material within said cylinder, a pair of rolls adapted to form material from the container into a sheet of plastic material, a row of rolls adjacent the wall of said cylinder, means to rotate all of said rolls and said cylinder, said sheet passing between said wall of the cylinder and the rolls in said row, and the rolls in said row being progressively nearer to the wall of the cylinder so as to gradually force the sheet of material into said orifices.

7. The method of forming a mold orifice through a plate which comprises cutting a groove on one side of the plate across the position to be occupied by the orifice, cutting an endless channel through the plate to form the orifice, said channel intersecting said groove, and inserting a supporting strip into said groove in the body of the plate and also in the center cut out by formation of said channels.

IRWIN ELLIOTT.